(12) United States Patent
Litwin, Jr. et al.

(10) Patent No.: US 7,073,083 B2
(45) Date of Patent: Jul. 4, 2006

(54) METHOD AND SYSTEM FOR PROVIDING EMERGENCY SHUTDOWN OF A MALFUNCTIONING DEVICE

(75) Inventors: Louis Robert Litwin, Jr., Plainsboro, NJ (US); Kumar Ramaswamy, Plainsboro, NJ (US)

(73) Assignee: Thomas Licensing, Boulogne-Billancourt (FR)

( * ) Notice: Subject to any disclaimer, the term of this patent is extended or adjusted under 35 U.S.C. 154(b) by 716 days.

(21) Appl. No.: 09/908,230

(22) Filed: Jul. 18, 2001

(65) Prior Publication Data

US 2003/0018922 A1 Jan. 23, 2003

(51) Int. Cl.
*G06F 1/26* (2006.01)
(52) U.S. Cl. .......................... 713/324; 709/205; 714/4
(58) Field of Classification Search ............... 713/310, 713/324; 370/461, 462; 714/4; 709/205
See application file for complete search history.

(56) References Cited

U.S. PATENT DOCUMENTS

| | | | | |
|---|---|---|---|---|
| 4,159,470 A * | 6/1979 | Strojny et al. ................. 714/4 |
| 4,402,082 A * | 8/1983 | Cope .......................... 714/712 |
| 4,556,864 A | 12/1985 | Roy ........................ 340/310 A |
| 4,583,232 A | 4/1986 | Howell ........................... 375/8 |
| 4,644,546 A * | 2/1987 | Doi et al. ..................... 714/800 |
| 4,787,083 A * | 11/1988 | Tanaka ......................... 370/431 |
| 4,845,466 A | 7/1989 | Hariton et al. .......... 340/310 R |
| 4,937,811 A | 6/1990 | Harris ........................... 370/5 |
| RE33,521 E * | 1/1991 | Mori et al. ................. 710/100 |
| 5,058,056 A * | 10/1991 | Hammer et al. ................ 714/4 |
| 5,072,370 A | 12/1991 | Durdik ........................ 395/575 |
| 5,086,427 A * | 2/1992 | Whittaker et al. ........... 370/462 |
| 5,089,974 A | 2/1992 | Demeyer et al. ........... 364/492 |
| 5,345,437 A * | 9/1994 | Ogawa ........................ 370/228 |
| 5,570,085 A | 10/1996 | Bertsch ................. 340/825.07 |
| 5,633,857 A * | 5/1997 | Kim et al. ................... 370/242 |
| 5,684,826 A | 11/1997 | Ratner ......................... 375/222 |
| 5,691,715 A | 11/1997 | Ouellette ............... 340/870.09 |
| 5,727,155 A * | 3/1998 | Dawson ...................... 709/205 |
| 5,938,757 A | 8/1999 | Bertsch ........................ 712/36 |
| 5,940,586 A * | 8/1999 | Bealkowski et al. ............ 714/5 |
| 6,065,135 A * | 5/2000 | Marshall et al. .............. 714/11 |
| 6,138,199 A * | 10/2000 | Fleischer .................... 710/316 |
| 6,151,688 A | 11/2000 | Wipfel et al. ................. 714/48 |
| 6,330,648 B1 * | 12/2001 | Wambach et al. .......... 711/163 |
| 6,535,990 B1 * | 3/2003 | Iterum et al. .................. 714/4 |
| 6,633,761 B1 * | 10/2003 | Singhal et al. ............. 455/436 |
| 6,728,207 B1 * | 4/2004 | Askinger et al. ........... 370/224 |

OTHER PUBLICATIONS

PCT Search Report dated: Sep. 18, 2002.

* cited by examiner

*Primary Examiner*—Chun Cao
(74) *Attorney, Agent, or Firm*—Joseph J. Laks; Ronald H. Kurdyla; Guy H. Eriksen

(57) ABSTRACT

In a network system having a plurality of devices communicating via a network, a method and system for providing an emergency signal is provided. In one embodiment, a device is malfunctioning if the device continuously transmits data to the network without proper authorization. Another properly functioning device transmits the emergency signal via an auxiliary channel to the malfunctioning device. The auxiliary channel is a separate channel supporting the transmission of the emergency signal. The malfunctioning device receives the emergency signal and disables itself in response to this signal.

25 Claims, 4 Drawing Sheets

US 7,073,083 B2

METHOD AND SYSTEM FOR PROVIDING EMERGENCY SHUTDOWN OF A MALFUNCTIONING DEVICE

FIELD OF THE INVENTION

This invention relates to data transmission of electronic signals. In particular, the invention is directed to a method and system for providing emergency shutdown of a malfunctioning device.

BACKGROUND OF THE INVENTION

Many devices communicate with other devices in a shared media environment. Such devices use a common network to transmit and receive data. The transmitted and received data may include any type of transmittable signal, e.g., video, audio, and the like.

In a shared media environment, only one device may transmit data over the network at any given instant in time. Otherwise, if two devices attempt to simultaneously transmit data over a data channel of the network, bus contention or data collision may occur, thereby invalidating the data transmitted from the device(s).

To prevent contention in the network, each device may receive some form of permission or authorization to transmit data via the data channel. For example, the device must receive a token prior to transmitting data or the device may only transmit during a predetermined time frame.

However, devices are subject to malfunctions. For example, the device may have a defective transceiver, and/or poorly written code. In some instances, such a malfunction may cause the device to continuously transmit data over the network. If such transmission of data is unauthorized, e.g., a token has expired for the transmitting device, then the malfunction causes congestion of the network. Such congestion prevents all other devices from using the network to transmit data. Therefore, there is a need in the art to eliminate the network congestion caused by such a malfunctioning device.

SUMMARY OF THE INVENTION

In accordance with the principles of the present invention, an emergency (control) signal is transmitted from a first (master) device via an auxiliary channel to a second (slave) device having a detected malfunction. The malfunctioning device is disabled in response to the emergency signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
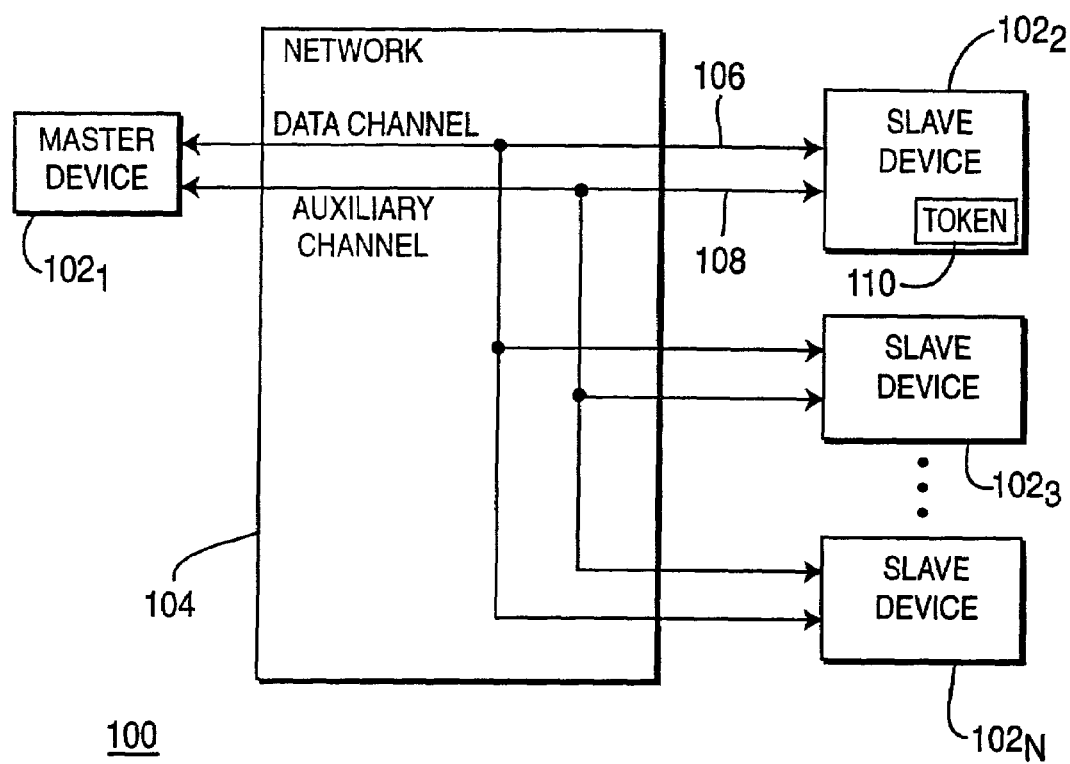
FIG. 1 depicts a block diagram of a system having a master device and at least one slave device sharing a network.

FIG. 1 depicts a block diagram of a system 100 having a plurality of devices $102_1, 102_2, \ldots, 102_N$ (generally referred to as devices 102) sharing a network 104. The network 104 comprises a data channel 106 and an auxiliary channel 108. The data channel 106 comprises a medium for the transmission of data among the devices 102 in the system. The auxiliary channel 106 comprises a medium for the transmission of an emergency signal to the devices 102. In one embodiment of the network 104, the data channel 106 and the auxiliary channel 108 use different frequencies carried via a common physical medium. In another embodiment of the network 104, the data channel 106 and the auxiliary channel 108 use different spreading codes carried via a common physical medium.

Each of the devices 102 may communicate with another device 102 via the network 104. The devices 102 operate in a shared media environment. Namely, the devices 102 use the common network 104 to transmit and receive data within the system 100. The transmitted and received data may include any type of transmittable signal, e.g., video, audio, and the like.

In such a shared media environment, only one device 102 may transmit data over the data channel 106 at any given instant in time. Otherwise, if two devices 102 attempt to simultaneously transmit data over the data channel 106, bus contention or data collision will occur, thereby invalidating the transmitted data from the device(s) 102.

During normal operation of the system 100, each device 102 may transmit or receive data from another device 102 via the data channel 106 of the network 104. To prevent contention in the network 104, each device 102 must receive permission or authorization to transmit data via the data channel 108. In one embodiment, the device 102 must receive a token 110 as a condition for transmitting data via the data channel 106.

However, each of the devices 102 may be subject to a malfunction. Such malfunctions may include hardware malfunctions, e.g., a defective transceiver, and/or software malfunctions, e.g., poorly written code. In one embodiment, the malfunction causes the device 102 to continuously transmit data via the data channel 106. If such transmission of data is unauthorized, e.g., a token 110 has expired for the transmitting device 102, then the malfunction congests the network 104. Such congestion prevents all other devices 102 from transmitting data via the data channel 106.

To overcome the congestion caused by the malfunctioning device, the present invention provides an emergency shutdown of one or more devices 102 in the network 100. An emergency shutdown signal is transmitted via the auxiliary channel 108 from one device 102 to one or more malfunctioning devices 102 in the system 100. The auxiliary channel 108 may use a different physical medium or a common physical medium employing a different frequency or spreading code than that employed by the data channel 106. The emergency shutdown signal causes the malfunctioning device 102 to shut off its data transmission portion. As such, other devices 102 may now transmit data via the data channel 106.

In one embodiment, the plurality of devices 102 are configured as a master device $102_1$ and one or more slave devices $102_2, 102_3, \ldots, 102_N$ (slave devices are hereinafter referred to as $102_N$) The master device $102_1$ is responsible for controlling the transmission of data among all devices 102 in the system 100. Namely, the master device 102 determines or authorizes which device 102 may transmit data via the network 104 at any given instant in time. The control of the transmission of data may be implemented in accordance to a Media Access Control (MAC) protocol.

The slave devices $102_N$ may transmit data as determined by the master device $102_1$. In one embodiment, the master device $102_1$ may allocate one token 110 among all devices 102, i.e., including the slave devices $102_N$. The slave device $102_N$ must acquire or receive the token as a condition for transmitting data via the data channel 106. If the token 110 expires or if the device 102 releases the token 110, then the slave device, e.g., $102_2$, is no longer enabled to transmit data via the data channel 106. As such, only one device 102 is eligible to transmit data via the data channel 106 at any given instant in time.

Different configurations of the devices 102 are possible. In one embodiment, the master device $102_1$ and the slave devices $102_N$ are configured as a stereo and speaker arrangement. In another embodiment, the devices 102 are computer systems. For example, the master device $102_1$ may comprise a host computer while the slave devices $102_N$ comprise general purpose computers. The devices 102 may comprise powerline modems or wireless modems to transmit to and receive data from the data channel 106.

The devices 102 may also detect a malfunctioning device 102 in the system 100. In one embodiment, the master device $102_1$ detects whether any of the slave devices $102_N$ are malfunctioning. For example, if one or more of the slave devices $102_N$ are configured to transmit data during specific time slots in, for example, a TDMA (time division multiple access) manner, the master device $102_1$ determines whether each slave device $102_N$ is transmitting data outside of its assigned time slot. If a token 110 is used to enable transmission of data from the slave devices $102_N$, the master device $102_1$ may determine whether a slave device $102_N$ has transmitted data after the token 110 has expired for the device $102_N$.

Additionally, the master device $102_1$ may use a polling mechanism to determine whether any of the slave devices $102_N$ is malfunctioning. The master device $102_1$ sends a polling signal to one slave device $102_N$ via the data channel 106. The polling signal is configured to elicit a response from the slave device $102_N$. As such, if the slave device $102_N$ fails to respond to the polling signal, then the slave device $102_N$ is identified as malfunctioning.

Once the malfunctioning slave device $102_N$ is identified, the master device $102_1$ transmits an emergency signal via the auxiliary channel 108 to the identified slave device $102_N$. As previously discussed, the auxiliary channel 108 is physically or logically separate from the data channel 106. One embodiment of the emergency signal may contain a network address of the identified slave device $102_N$ and a command for the identified slave device $102_N$ to perform an emergency shutdown. The slave device $102_N$ may reset, e.g., turns off and on, in response to the emergency signal, e.g., a shutdown signal. As the previously malfunctioning device $102_N$ is reset, other devices 102 may now transmit data over the data channel 106.

The above embodiment presumes a functional master device $102_1$ and a proper identification of the malfunctioning slave device $102_N$ by the master device $102_1$. However, it is possible that the master device $102_1$ may malfunction or may improperly detect a malfunctioning slave device $102_N$.

To address these concerns, another embodiment of the system 100 may provide emergency shutdown of any device 102 in the system 100. Each of the devices 102 is configured to transmit an emergency signal over the auxiliary channel 108. To minimize the possibility of a simultaneous transmission of multiple emergency signals over the auxiliary channel 108, random, e.g., different, backoff times are assigned to each device 102. The backoff time represents the amount of time a device 102 must wait prior to transmitting the emergency signal. The assignment of backoff times is performed in accordance to conventional schemes, e.g., a Carrier Sense Multiple Access (CSMA) scheme or an ALOHA scheme.

A functioning device 102 having the earliest backoff time then transmits the emergency signal to all other devices 102 in the system 100. If another device 102 is also configured to simultaneously transmit the emergency signal, then the device 102 having the next earliest backoff time will transmit the emergency signal. All the other devices 102 are configured to shut off its data transmission portion upon receipt of the emergency signal.

Figure 2:
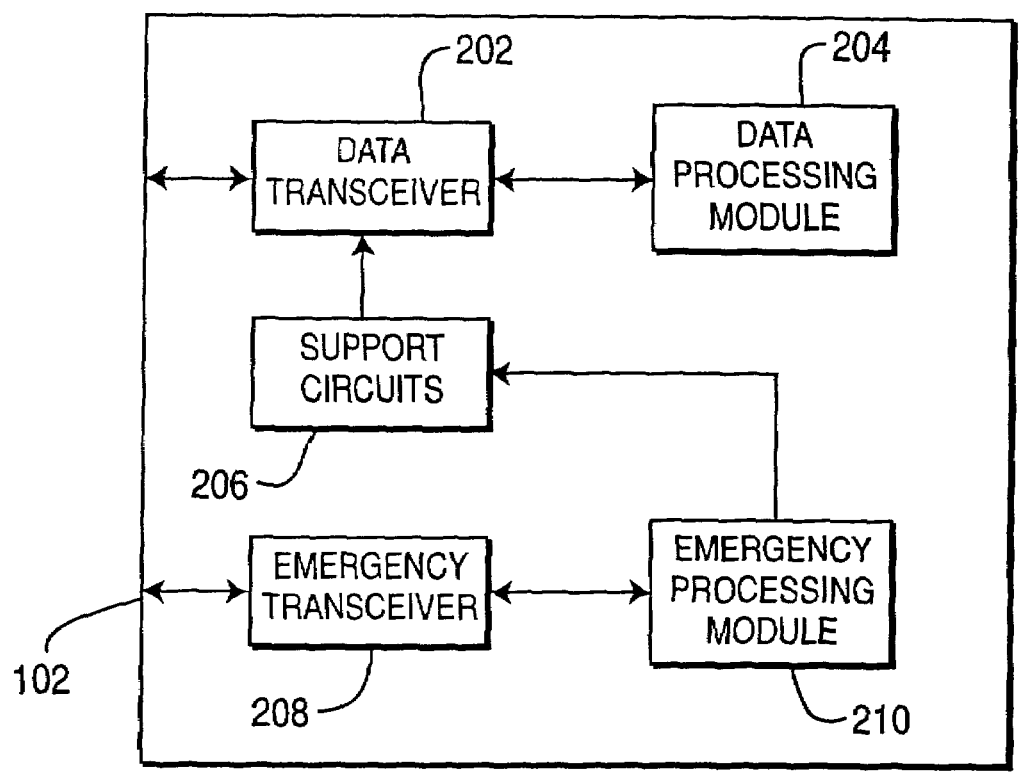
FIG. 2 depicts a block diagram of a master or slave device suitable for use in the system of FIG. 1.

FIG. 2 depicts a block diagram of one device 102 in the system 100 of FIG. 1. The device 102 may comprise either a master device $102_1$ or a slave device. One embodiment of the device 102 is a computer having a powerline modem. Specifically, the device 102 comprises a data transceiver 202, a data processing module 204, support circuits 206, an emergency transceiver 208 and an emergency processing module 210.

The data transceiver 202 enables the device 102 to communicate with other devices 102 during normal operation of the system 100. Specifically, the data transceiver 202 transmits data to the data channel 106 and receives data from the data channel 106. To enable the transmission of data, the data transceiver 202 may modulate data for transmission via the data channel 106. Similarly, to enable to reception of data, the data transceiver 202 uses tuners and demodulators as is well known in the art.

The data processing module 204 comprises a computer controlled module to coordinate the transmission and reception of data for the device 102. The data processing module 204 may include a processor, a memory, a data source and a data storage. The data transceiver 202 and the data processing module 206 collectively implement the normal operation of the device 102, e.g., transmit and receive data.

The support circuits 106 support the normal operation of the device 102. The support circuits are coupled to the data transceiver 202 and the emergency processing module 210. In one embodiment, the support circuits 106 may comprise a relay and a power supply. For example, the relay may become triggered (energized or de-energized) in response to a signal from the emergency processing module 210. The triggered relay will then shut off the power to the data transceiver 202, thereby disabling the device 102 from transmitting or receiving data. That is, the output state of the relay is changed in a manner causing the power to be terminated or the device 102 to otherwise enter an idle state.

The emergency transceiver 208 enables the device 102 to communicate with other devices 102 via the auxiliary channel 108. During the emergency operation of the system 100, the emergency transceiver 208 may either receive an emergency signal from the auxiliary channel 108 or transmit the emergency signal to the auxiliary channel 108. The emergency transceiver 208 may also modulate outgoing signals and demodulate incoming signals. However, the modulation and demodulation is performed with respect to the auxiliary channel 108, which uses different frequencies or spreading codes than the data channel 106.

The emergency processing module 210 comprises a computer controlled module to coordinate the transmission and reception of an emergency signal. The emergency processing module 210 may also transmit a signal to trigger the relay 206 and shut off the data transceiver 202. In one embodiment, the emergency processing module 210 confirms the receipt of the emergency signal at the emergency transceiver 208 prior to transmitting the signal to the relay 206. The emergency processing module 204 may also include a processor, a memory and associated software. The emergency processing module 210 and emergency transceiver 208 collectively implement the emergency operation of the device 102, e.g., transmit and receive the emergency signal.

The data processing module 204 and the emergency processing module 210 discussed above represent physical devices. Alternatively, the data processing module 204 and the emergency processing module 210 may comprise one or more software applications, where the software is loaded from a storage medium, (i.e., a magnetic or optical drive or diskette) and operated by the processor in the respective modules 204 and 210. As such, these software applications (including associated data structures) of the present invention can be stored on a computer readable medium, i.e., RAM memory, magnetic or optical drive or diskette and the like. The data processing module 204 and the emergency processing module 210 may also be represented by a combination of software and hardware, i.e., using application specific integrated circuits (ASIC).

Figure 3:
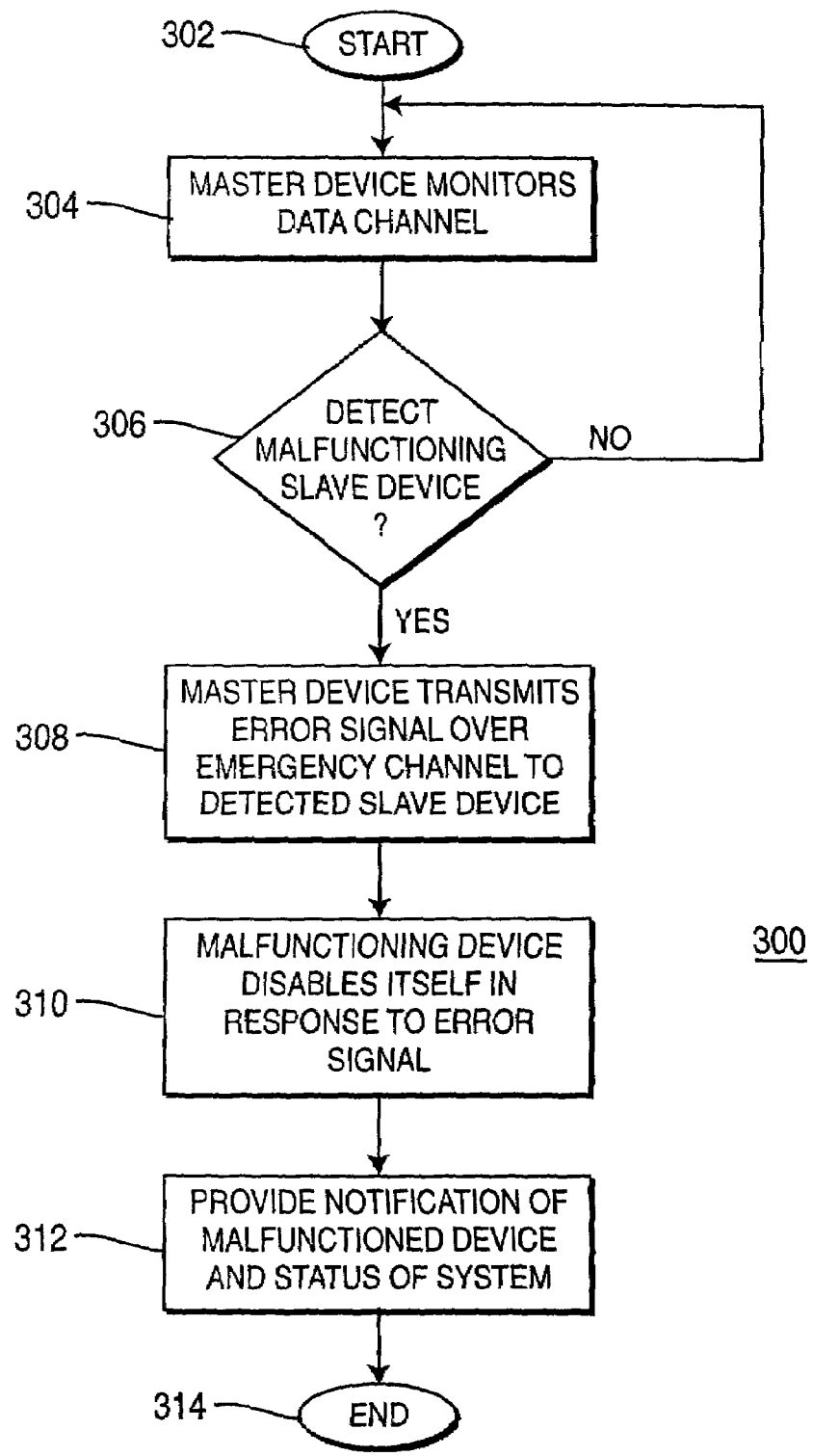
FIG. 3 depicts a flow diagram of a method for providing emergency shutdown in one embodiment of the invention.

FIG. 3 depicts a flow diagram of a method 300 for providing emergency shutdown in one embodiment of the invention. The method 300 provides an emergency shutdown of a malfunctioning or defective slave device $102_N$. Specifically, the method 300 starts at step 302 and proceeds to step 304 where the master device $102_1$ monitors the data channel 106. At step 306, the master device $102_1$ determines whether any of the slave devices $102_N$ is malfunctioning. Namely, step 306 determines whether any of the slave devices $102_N$ is still transmitting data to the data channel 106 without having authorization from the master device $102_1$. For example, the malfunctioning slave device $102_N$ may still transmit data over the data channel 106, even after its assigned token or time slot has expired.

If no malfunctioning slave devices $102_N$ are detected, the method 300 returns to step 304 where the master device $102_1$ continues to monitor the data channel 108. If a malfunctioning slave device $102_N$ has been detected, the method 300 proceeds to step 308 where the master device $102_1$ transmits an error signal over the auxiliary channel 110 to the defective, i.e., malfunctioning, slave device. At step 310, the malfunctioning slave device $102_N$ disables itself in response to the error signal transmitted from the master device $102_1$. More specifically, at step 310, the malfunctioning slave device $102_N$ receives the emergency signal and activates the power switch 208, which then disables the support circuits 206 and the data transceiver 202 of the slave device $102_N$. As such, the slave device $102_N$ is at least temporarily disabled from transmitting additional data to the data channel 106.

After the malfunctioning slave device $102_N$ is disabled, the method 300 proceeds to step 312 where notification of the malfunctioning slave device $102_N$ and the status of the network 104 are provided on a display coupled to at least one of the devices 102. The method 300 then proceeds to end at step 314.

In the method 300 of FIG. 3, the master device $102_1$ is presumed to be functional. Additionally, the master device $102_1$ is presumed to properly identify a malfunctioning slave device $102_N$. However, it is possible for the master device $102_1$ to be malfunctioning or for the master device $102_1$ to be unable to properly detect a malfunctioning slave device $102_N$. Thus, there is a need to provide an emergency shutdown signal to address such situations.

Figure 4:
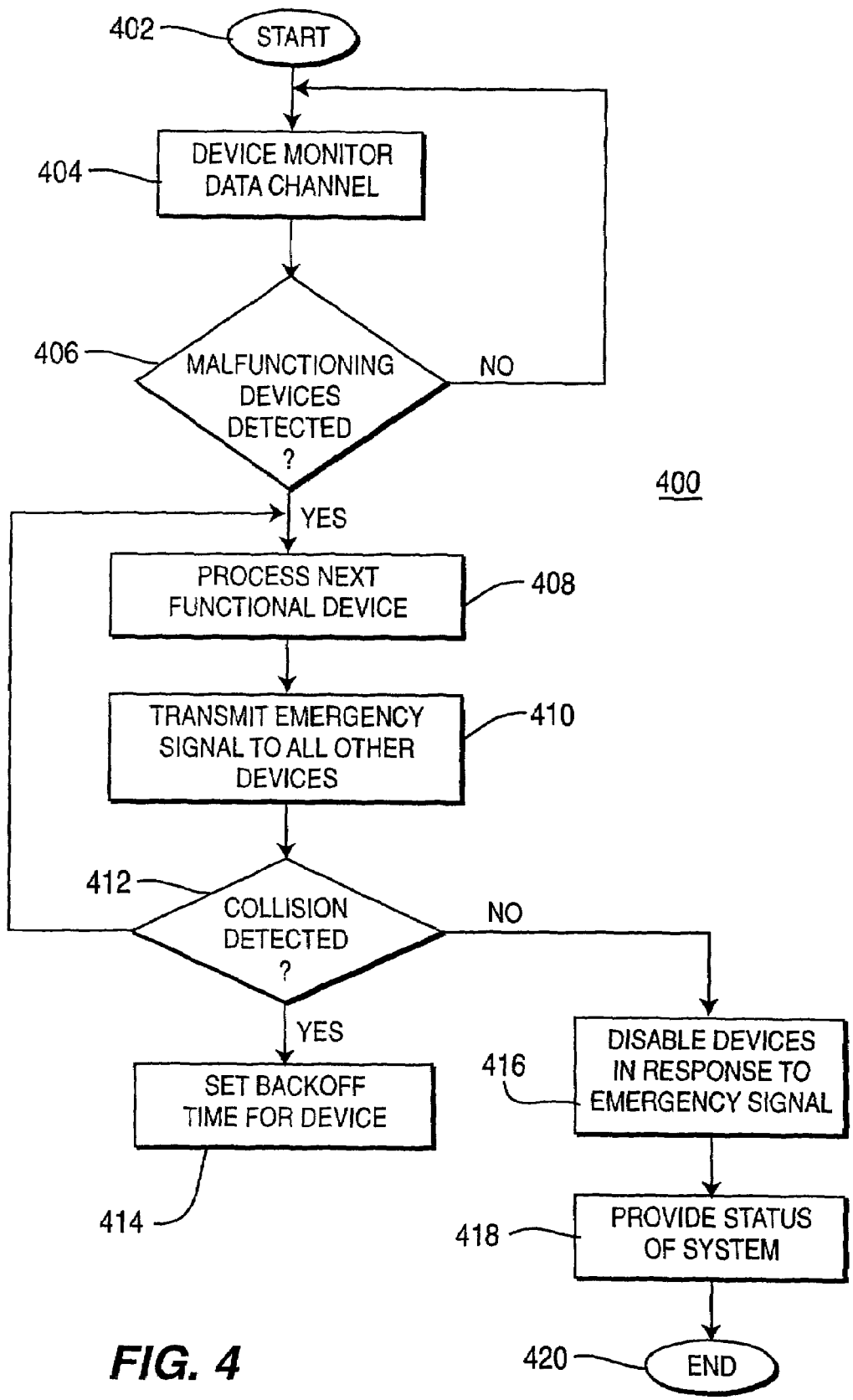
FIG. 4 depicts a flow diagram of a method for providing emergency shutdown in another embodiment of the invention.

FIG. 4 depicts a flow diagram of a method 400 for providing emergency shutdown in another embodiment of the invention. In contrast to the embodiment of FIG. 3, the method 400 may provide an emergency shutdown of any malfunctioning device 102, e.g., the master device $102_1$, in the system 100. Specifically, the method 400 starts at step 402 and proceeds to step 404 where one or more of the devices 102, i.e., the master device $102_1$ and the slave devices $102_N$, monitor the data channel 106.

At step 406, a query determines whether any malfunctioning devices 102 are detected in the system 100. In one embodiment, the malfunctioning devices 102 may comprise the master device $102_1$ and/or at least one slave device $102_N$. Namely, step 406 determines whether one or more of the devices 102 has detected an indication of a malfunctioning device 102, e.g., busy data channel 106 when the token 110 has expired. As the malfunctioning device 102 may include the master device $102_1$, step 406 does not attempt identify the malfunctioning device 102.

If no malfunctioning devices 102 are detected in the system 100, the method 400 returns to step 404 where the devices 102 continue to monitor the data channel 106. If one or more malfunctioning devices 102 are detected, the method 400 proceeds to step 408 where the next functional device 102 is processed. Step 408 processes the device 102 currently having the shortest "backoff time." Each of the remaining functional devices 102 is configured to transmit an emergency signal via the auxiliary channel 108. To avoid all of the simultaneous transmission of the emergency signal from all functioning devices 102, the devices 102 have different or randomly assigned backoff times. The backoff time indicates the time for the device 102 to transmit the emergency signal.

In contrast to the method 300 of FIG. 3, the emergency signal of the method 400 of FIG. 4 is sent to all other devices 102 in the system 100. The emergency signal is configured to shut down or turn off the device 102 receiving the emergency signal. As such, the emergency signal is configured to shut down or turn off all other devices 102 in the system 100.

At step 410, the device 102 transmits the emergency signal via the auxiliary channel 108 to all other devices 102 in the system 100. The method 400 proceeds to step 412 where a query determines whether the (transmitting) device 102 detects a collision in the auxiliary channel 108. Step 412 determines whether another device 102 has also simultaneously transmitted the emergency signal over the auxiliary channel 108. The collision occurs when the emergency signal is simultaneously transmitted from two separate devices 102.

If a collision is detected in the auxiliary channel 108, the method 400 proceeds to step 414 where another backoff time is set for the device 102. After step 414, the method 400 returns to step 408 where the next functioning device 102, e.g., device 102 having the next earliest backoff time, is processed. If no collision is detected in the auxiliary channel 108, the method 400 proceeds to step 416 where the other devices 102 are reset or temporarily disabled in response to the emergency signal. By sending the emergency signal to all other devices 102, the method 400 resets the malfunctioning devices 102. At step 418, the method 400 provides a status of the system 100. For example, step 418 may provide a notification that the devices 100 in system 100 have been reset. After step 418, the method 400 proceeds to end at step 420.

Although various embodiments which incorporate the teachings of the present invention have been shown and described in detail herein, those skilled in the art can readily devise many other varied embodiments that will still incorporate these teachings.

What is claimed is:

1. In a network system having one master device and at least one slave device communicating via a network having a data channel and an auxiliary channel, a method comprising:
    transmitting an emergency signal from said master device via said auxiliary channel to a slave device having a detected malfunction; and
    said emergency signal adapted to cause the disabling of said slave device having the detected malfunction.

2. The method of claim 1 wherein said master device and said at least one slave device each comprise one of a powerline modem and a wireless modem.

3. The method of claim 1 wherein a malfunction is detected by:
    determining, if said slave device is transmitting data via said data channel, whether said slave device is authorized to transmit data via said data channel.

4. The method of claim 3 wherein said slave device is authorized to transmit data via said data channel if at least one of a current time slot and an unexpired token is assigned to said slave device.

5. The method of claim 1 further comprising:
    notifying a user of the malfunctioned state of the detected slave device.

6. The method of claim 1 wherein said disabling comprises:
    transmitting said emergency signal to a relay used to control power of said detected malfunctioning slave device, said emergency signal adapted to cause said relay to change output states.

7. The method of claim 1 wherein said auxiliary channel uses a different frequency than said data channel.

8. The method of claim 1 wherein said auxiliary channel uses a different spreading code than said data channel.

9. The method of claim 1 wherein at least one of said master device and said at least one slave device comprise a computer system.

10. The method of claim 1 further comprising:
    transmitting a signal to said disabled slave device adapted to cause the powering up of said disabled slave device.

11. In a network system having a first device and a second device communicating via a network having a data channel and an auxiliary channel, a method comprising:
    transmitting an emergency signal from said first device via said auxiliary channel to said second device having a detected malfunction; and
    said emergency signal adapted to cause the disabling of said second device having the detected malfunction,
    wherein said first device and said second device are stand-alone devices.

12. In a network system having a plurality of devices communicating via a network having a data channel and an auxiliary channel, where said auxiliary channel is at least logically separated from said data channel, a method comprising:
    detecting whether a malfunction exists for at least one device;
    selecting a device that is properly functioning;
    transmitting an emergency signal from said selected device to all other devices via said auxiliary channel, said emergency signal adapted to cause the disabling of said at least one device for which the malfunction exists,
    wherein said selected device and said at least one device for which the malfunction exists are stand-alone devices.

13. The method of claim 12 wherein said selecting is performed in accordance to a Carrier Sense Multiple Access (CSMA) scheme.

14. The method of claim 12 wherein said selecting is performed in accordance to an ALOHA scheme.

15. The method of claim 12 wherein said selecting comprises:
    selecting said device having a backoff time that is the earliest.

16. The method of claim 12 further comprising:
    resetting said at least one device using a reset signal.

17. The method of claim 12 further comprising:
    powering up said disabled devices to effect a reset of said previously disabled devices.

18. The method of claim 12 further comprising:
    notifying a user of a reset of said plurality of devices.

19. The method of claim 12 wherein said plurality of devices comprise a master device and at least one slave device.

20. The method of claim 12 wherein said plurality of devices each comprise one of a powerline modem and a wireless modem.

21. The method of claim 12 wherein said auxiliary channel uses a different frequency than said data channel.

22. The method of claim 12 wherein said auxiliary channel uses a different spreading code than said data channel.

23. A network system adapted for communication via a network having a data channel and an auxiliary channel, said system comprising:
    a master device for transmitting an emergency signal via said emergency channel; and
    at least one slave device having a detected malfunction, said at least one slave device disabling itself upon receipt of said emergency signal via said emergency channel, wherein said master device and said at least one slave device are stand-alone devices.

24. In a network system having one master device and at least one slave device communicating via a network having a data channel and an auxiliary channel, a computer-readable medium having stored thereon a plurality of instructions which when executed by a processor cause the processor to perform the steps comprising:
    transmitting an emergency signal from said master device via said auxiliary channel to a slave device having a detected malfunction; and
    said emergency signal adapted to cause the disabling of said slave device having the detected malfunction,
    wherein said master device and said slave device having the detected malfunction are stand-alone devices.

25. In a network system having one master device and at least one slave device communicating via a network having a data channel and an auxiliary channel, a computer-readable medium having stored thereon a plurality of instructions which when executed by a processor cause the processor to perform the steps comprising:

detecting whether a malfunction exists for at least one device;

selecting a device that is properly functioning;

transmitting an emergency signal from said selected device to all other devices via said auxiliary channel, said emergency signal adapted to cause the disabling of said at least one device for which the malfunction exists, wherein said selected device and said at least one device for which the malfunction exists are stand-alone devices.

* * * * *